United States Patent [19]

Schlimme et al.

[11] 3,796,143

[45] Mar. 12, 1974

[54] DEVICE FOR THE GERMINATION AND DRYING OF MALT

[75] Inventors: Gisbert Schlimme, Braunschweig; Manfred Tschirner, Wolfenbuttel, both of Germany

[73] Assignee: Miag Muhlenbau Und Industrie GmbH, Braunschweig, Germany

[22] Filed: Dec. 8, 1972

[21] Appl. No.: 313,422

[30] Foreign Application Priority Data
Dec. 15, 1971   Germany............................ 2162167

[52] U.S. Cl. ............................................. 99/277.2
[51] Int. Cl. .............................................. C12g 3/00
[58] Field of Search ....... 99/276, 277, 277.1, 277.2, 99/278, 323.12, 31, 42, 43, 48, 51, 52

[56] References Cited
UNITED STATES PATENTS
568,132    9/1896    Feroe .................................. 99/277
2,758,030  8/1956    Metz ................................... 99/278
3,583,875  6/1971    Wiesenauer ......................... 99/278
3,589,270  6/1971    Schlimme ......................... 99/277.2

Primary Examiner—Robert W. Jenkins
Attorney, Agent, or Firm—Hill, Sherman, Meroni, Gross & Simpson

[57]   ABSTRACT

A device for the germination and drying of malt charged onto the radially outer portion of an annular rotating rack and gradually shifted radially inwardly by means of rotary worm means extending radially across said annular rack and being suspended by threaded spindles for movement downwardly and upwardly between charge and discharge openings in an outer wall surrounding said annular rack.

7 Claims, 3 Drawing Figures

DEVICE FOR THE GERMINATION AND DRYING OF MALT

The invention relates to a device for the germination and drying of malt, consisting of a plurality of annularly shaped rotatable racks disposed superimposed about a central compartment with work chambers containing worms for shifting of material, and having adjacent to the latter side compartments in which are located the feed and discharge conduits for the material.

A material shifting worm is portrayed therewith which is movable vertically by means of threaded or worm-gear spindles whereby the spindles are located outside of the annularly shaped rack chamber. The covering of these spindles against the rack chamber which are to be constructed movably involve appreciable difficulties because they must be slidable along the charge on the rack.

These disadvantages are according to the invention overcome thereby that the threaded spindles, by means of which the material shifting worm is movable upwardly and downwardly between charge— and discharge-apertures located in the wall, are suspended—and indeed, particularly by means of gear units which are fixed on the ceiling of the top chamber of the rack. The material shifting worm is arranged in a manner known per se under a bearing member which constitutes the connection with the rack chamber and serves as central member for the entire material worm device.

The invention will be described in greater detail on the basis of an embodiment by way of example which is shown in the drawing in the following:

Figure 1:
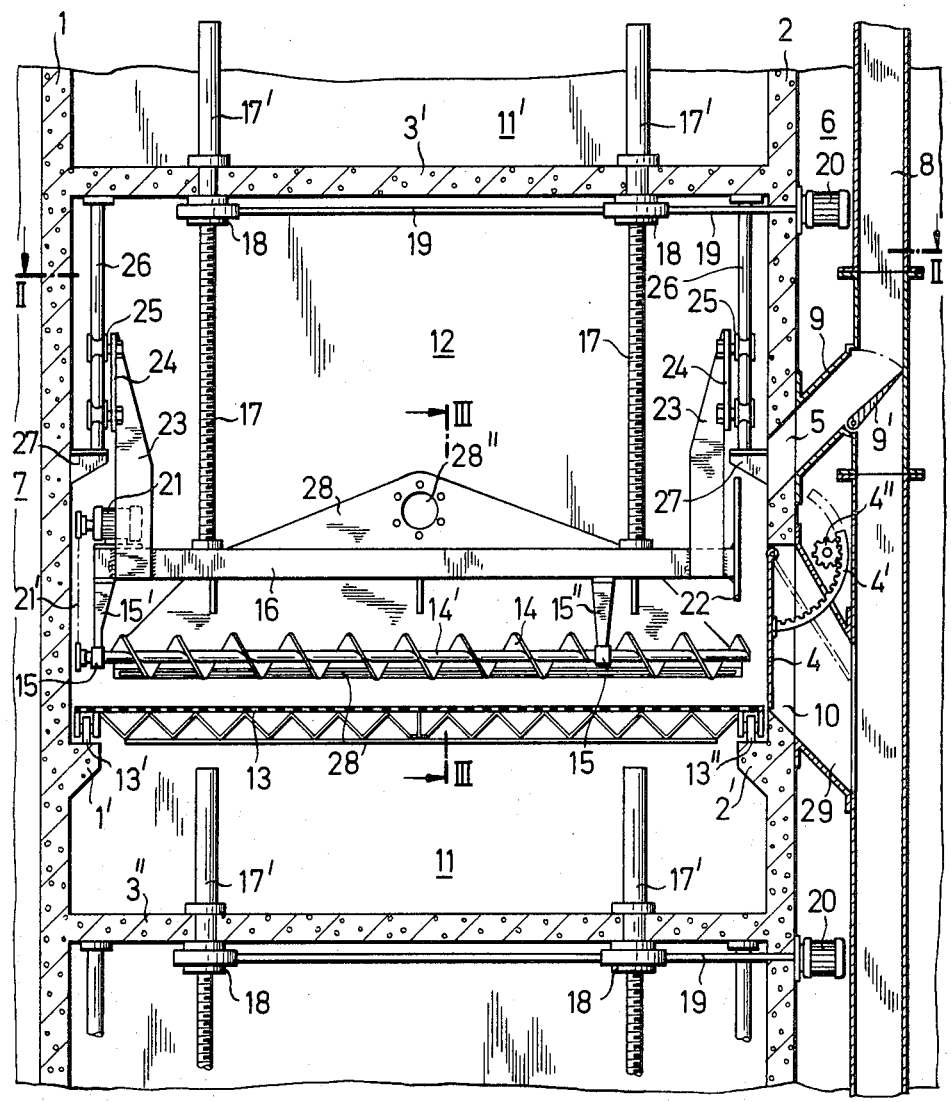
FIG. 1 shows a vertical radial section through a static malthouse consisting of a plurality of annular rack chambers arranged superimposed, according to section I — I of FIG. 2.
Figure 2:
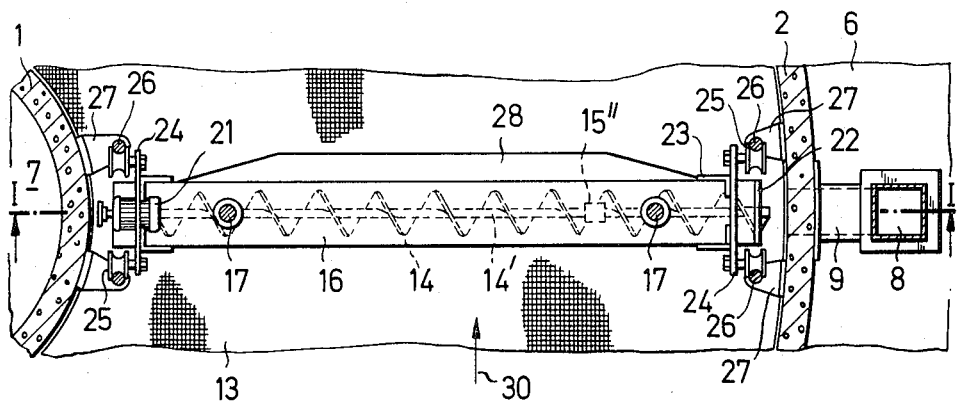
FIG. 2 shows a horizontal cross section through the device according to FIG. 1, in accordance with section II—II.

The right-hand part of an annularly shaped rack chamber shown in FIG. 1 is limited by the inner cylinder wall 1 which surrounds the central compartment 7, by the outer cylinder wall 2, as well as by the roof 3' of the top chamber 12 of the rack and by the floor 3'' of the lower chamber 11 of the rack. Both rack chambers are separated by the annularly shaped rack 13 which is without walls and is movable rotatably on projections 1' and 2' of the cylinder walls by means of their wheels 13', 13'' about the axis (not shown) of the central compartment 7.

Above the annularly shaped rack 13 is arranged the material shifting worm 14 which extends radially between the inner cylinder wall 1 and the outer cylinder wall 2 and extends onto the same. The material shifting worm 14 is held freely rotatable in its position by two bearings 15, which are fixed by means of bearing arms 15', 15'' on the carrier 16 constructed as box beam. On the latter are also fixed two threaded spindles 17 which are each suspended by means of a gear 18 on the ceiling 3' of the top chamber 12 of the rack. The drive gear 18 contains in a manner known per se (not shown) a worm gear guided rotatably in the housing and constructed as nut for the threaded spindles 17, said worm gear each being capable of being rotated by a worm seated on the shaft 19, whereby the motor 20 arranged outside of the rack chamber serves as drive. The threaded spindles 17 upon lifting the material shifting worm 14, move into the lower chamber 11 of the rack disposed thereabove—are, however, protected against undesirable influences by means of the protective sleeves 17'.

On the inner left end of the carrier 16 is located the drive motor 21 which is connected by means of a tension medium 21' shown in dash-dotted lines, with the shaft 14' of the material shifting worm 14. At the other end of the carrier 16 is arranged a guide plate 22 which has sufficient spacing from the outer cylinder wall 2 in order to deflect downwardly the material entering from the feed aperture 5.

The carrier 16 has in addition at each end a pair of arms 23 extending upwardly which are connected with one another by means of a plate 24. In the latter are supported four wheels 25, of which two each are arranged above and two each adjacent one another. The wheels travel between rails 26 which are fixed on brackets 27 of the cylinder walls 1, 2 and in the ceilings 3' of the top chambers 12 of the racks.

Figure 3:
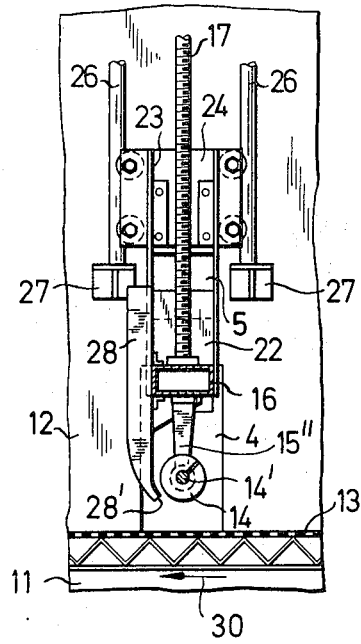
FIG. 3 shows a vertical section transversely through the material shifting worm, according to section III—III of FIG. 1.

Finally, there is additionally fixed on the carrier 16 an essentially vertical grading plate 28 which may be constructed as a box and may terminate in a blower nozzle 28' (FIG. 3). The box-shaped grading plate 28 possesses an opening 28'' at the top, to which may be fastened a fan or blower (not shown).

Adjacent the rack chambers 11, 12 arranged superimposed is mounted a vertical side-compartment 6 which contains a down-pipe 8 for the material to be charged and discharged. In the down-pipe is located an Y-pipe 9 provided with a reversible flap 9', the inclined part of said Y-pipe being connected with the feed aperture 5 in the outer cylinder wall 2. Somewhat below the feed aperture 5 is provided on the outer cylinder wall 2 the discharge aperture 10. It may be closed by means of a flap 4 which may be shifted on a curved tooth rack 4' by means of a motor pinion or drive 4'' into the dash-dotted position. The flap 4 swings into a discharge channel 29 which is connected with the down-pipe 8.

The motor 20 for the shaft 19 may be disposed (also not shown) between the two drives 18 and fastened on the ceiling 3'. The transport means 23, 24 and 25 of the carrier 16 may also be replaced by a slide mechanism. With smaller embodiments, the transport mechanism 23 to 25 may indeed be omitted altogether, when the spindles 17 and their guide members are constructed sufficiently resistant to bending. The modus operandi of the installation shown will be described hereinafter.

Prior to the charging of the rack, the material shifting worm 14 will be brought to a predetermined position as to height, thereby that the motor 20 is turned on and the shaft 19 driven, whereby the worm-wheel nuts located in the drives 18 are rotated and the material shifting worm 14 is raised. Then the reversible flap 9' of the Y-pipe 9 is brought into the position shown in FIG. 1 and material permitted to run in, which travels through the feed aperture 5 against the conducting plate 22 of the carrier 16 and is deflected downwardly. The material then forms a heap below the outer end of the material shifting worm 14. Before said heap reaches the material shifting worm 14, it is set in rotation by means of turning on the drive motor 21, whereby the further material arriving is conveyed off toward the center. If a wall of material has formed which reaches to the inner cylinder wall 1, if need be by means of a pushbutton, the annular rack 13 and simultaneously also the later reversing worms, not shown, are set in rotation. The reversing worms, if FIG. 3 is considered, are mounted to the left of the material shifting worm 14, and the annular rack 13 moves counter to the direction of the arrow 30. If the annular rack 13 has covered a determined angle or if the pushbutton is released, the rack is held stationary and the reversing worm stopped and the charging procedure goes one step further, as predescribed. This procedure is continued stepwise or successively up to complete loading of the annular rack 13. The reversing worms, not shown, take care of the equalization and loosening or aeration of the material which has not yet been evened by the grading plate 28. Thereupon, the reversible valve flap 9' is brought into the vertical position and the treatment provided may take place on the annular rack 13, for example, drying.

If the annular rack is to be unloaded or cleared, the discharge aperture 10 is opened by means of setting the valve flap 4 inclined in the dash-dotted position, the material shifting worm 14 is turned on and lowered for a predetermined amount, the annular rack 13 is set in motion in direction of the arrow 30 (FIG. 3), and the reversing worm, not shown, turned on. The material will then continuously be conveyed off through the discharge channel 29 into the down-pipe. The lowering procedure is repeated once or twice until the material shifting worm 14 is located a few millimeters above the annular rack 13. In the last stage of the clearing, air is blown in through the aperture 28'' into the hollow grading plate 28 and passes out through its blower nozzle 28' against the movement of the rack, whereby residual grains blown to the material shifting worm 14 are grasped by the same and likewise cleared out. In this manner, not only is a complete clearing out of the rack possible without manual effort, but also its cleaning. The valve 4 is then closed again and the rack is ready for the next processing procedure.

In the case of too heavy a load, the down-pipe 8 may be divided into two pipes, of which the one serves solely for the charging and the other solely for the discharging. The drive of the annular rack is not shown for reasons of facility of inspection. It may, however, take place, for example, by means of three drive motors which project into the side compartment or are accessible from there and cooperate with a gear rack on the annular rack. Naturally also other types of drive may be utilized, for example, hydraulic drives.

What we claim is:

1. Device for the germination and drying of malt, comprising a plurality of annular racks mounted for rotation about a central shaft, work chambers in said racks, material shifting worms in said work chambers, side shafts disposed at the outside of said work chambers, feed and discharge conduits in said outside shafts and connectible with charge and discharge apertures in the outside walls of said work chambers, and threaded spindles supporting said material shifting worms from the ceiling of the work chambers and adapted for moving said material shifting worms upwardly and downwardly between said charge and discharge apertures.

2. Device according to claim 1, in which the threaded spindles are suspended above drive means on the ceiling of a top chamber of the rack.

3. Device according to claim 1, in which the material shifting worms are suspended from a carrier, such as a box beam which is fixed on the threaded spindles.

4. Device according to claim 3, in which said carrier at one end supports a drive motor for the material shifting worms.

5. Device according to claim 3, in which bearing arms for said material shifting worms are secured to said carrier.

6. Device according to claim 3, including a drive or slide mechanism in cooperation with guide means for the vertical movement of the material shifting worms.

7. Device according to claim 3, including a grading plate supported by said carrier and constructed as a box terminating in a blower nozzle which is directed along the material shifting worm.

* * * * *